United States Patent [19]

Eneroth et al.

[11] Patent Number: 5,752,998
[45] Date of Patent: May 19, 1998

[54] WATER-SPRAY SEPARATOR

[75] Inventors: Jan-Mats Eneroth, Växjö, Sweden; Leif Josefsson, Sterling Heights, Mich.; Dragoslav Milojevic, Butzbach, Germany

[73] Assignee: ABB Fläkt AB, Stockholm, Sweden

[21] Appl. No.: 676,213

[22] PCT Filed: Jan. 10, 1995

[86] PCT No.: PCT/EP95/00072

§ 371 Date: Oct. 16, 1996

§ 102(e) Date: Oct. 16, 1996

[87] PCT Pub. No.: WO95/19834

PCT Pub. Date: Jul. 27, 1995

[30] Foreign Application Priority Data

Jan. 21, 1994 [DE] Germany ............ 44 01 741.3

[51] Int. Cl.⁶ .................................................. B01D 47/10
[52] U.S. Cl. ........................... 55/240; 55/257.5; 55/276; 55/DIG. 46
[58] Field of Search .................. 55/220, 240, 241, 55/257.1–257.5, 276, DIG. 46

[56] References Cited

U.S. PATENT DOCUMENTS

| | | | |
|---|---|---|---|
| 3,795,093 | 3/1974 | Gerhard et al. | 55/240 X |
| 4,257,784 | 3/1981 | Gebhard et al. | 55/241 X |
| 4,279,196 | 7/1981 | Bloomer | 55/240 X |
| 4,328,012 | 5/1982 | Telchuk, Jr. et al. | 55/241 X |
| 4,345,921 | 8/1982 | Gustavsson et al. | 55/241 X |
| 4,350,506 | 9/1982 | Otto | 55/241 |
| 4,515,073 | 5/1985 | Dorsch et al. | 55/DIG. 46 |
| 4,537,120 | 8/1985 | Josefsson | 55/DIG. 46 |
| 4,582,515 | 4/1986 | Eneroth et al. | 55/240 X |
| 4,598,633 | 7/1986 | Otto et al. | 55/276 X |
| 4,952,221 | 8/1990 | Morioka | 55/240 |
| 5,040,482 | 8/1991 | McGuire et al. | 55/240 X |
| 5,100,442 | 3/1992 | Gore et al. | 55/240 |
| 5,147,422 | 9/1992 | Neeley et al. | 55/241 X |
| 5,286,268 | 2/1994 | Watanabe | 55/241 X |
| 5,336,283 | 8/1994 | Horisawa | 55/241 X |
| 5,425,670 | 6/1995 | Josefsson | 55/DIG. 46 |
| 5,545,239 | 8/1996 | Cordier | 55/276 X |

FOREIGN PATENT DOCUMENTS

| | | | |
|---|---|---|---|
| 0527002 | 2/1993 | European Pat. Off. . | |
| 2940180 | 4/1981 | Germany | 55/DIG. 46 |
| 3809850 | 7/1989 | Germany | 55/240 |
| 1111798 | 9/1984 | U.S.S.R. | 55/240 |
| 2039778 | 8/1980 | United Kingdom . | |
| 2120576 | 12/1983 | United Kingdom . | |

*Primary Examiner*—Robert Spitzer
*Attorney, Agent, or Firm*—Dilworth & Barrese

[57] ABSTRACT

A water-spray separator for purifying particle-polluted discharged air (9) from a working area, especially for purifying discharged air containing paint particles from a spray-painting booth, with a flow duct adjacent to the working area and with a cross-sectional extent set by two spaced duct walls (1, 2) into which the polluted discharged air (9) flows and into which a fluid (8) is introduced to run along the channel walls (1, 2). The duct comprises an inlet (1a, 2a), an adjacent expansion section (1c, 2c), an adjacent deflection section (4) which deflects the flow of discharged air transversely to the direction of flow in the inlet (1a, 2a), an adjacent nozzle (5), an adjacent duct outlet (6) in which there is an abrupt narrowing (7) in the duct cross-section, and a reflector section (3) formed on the duct wall opposite the nozzle (5) against the direction of flow through the nozzle (5) and reflecting the noise generated in the region of the nozzle (5) substantially back towards the nozzle (5).

23 Claims, 5 Drawing Sheets

WATER-SPRAY SEPARATOR

BACKGROUND OF THE INVENTION

The invention relates to a water-spray separator for purifying particle-polluted exhaust air from a working area and in particular for purifying exhaust air containing paint particles from a spray-painting booth with a flow duct adjacent to the working area and having a cross-sectional extent set by two spaced duct walls, into which polluted exhaust air flows and a fluid is introduced to run along the duct walls.

A main problem when designing water-spray separators is to keep the noise level within the working area as low as possible in order to create tolerable working conditions for the personnel working there. As is shown by the following statements, various measures were taken in conventional water-spray separators so as to reduce the noise level generated by the water-spray separator in the working area.

An apparatus for purifying the exhaust air of spray booths is known from DE 28 14 276. In the conventional apparatus, which is arranged below a base grid of the spray-painting booth, the exhaust air is first supplied to a sharp-edged constriction via a funnel-shaped inlet, the air is then subjected to a significant change of direction and supplied to a second sharp-edged constriction with a lower through-flow cross section than the first constriction so as to allow the exhaust air to flow subsequently into a chamber containing a fluid bath. A washing fluid is introduced into the apparatus along the guide walls of the funnel-shaped inlet so that a veil of fluid is produced at the first constriction edge of the flow duct. The fluid is atomized in a state of turbulence at the second constriction edge behind the change in direction of the flow of exhaust air and is homogeneously mixed with the exhaust air. The veil of fluid formed at the first constriction site causes the paint particles in the exhaust air to be wetted on their surface with washing fluid. A homogeneous air-fluid mixture, which encourages the paint particles contained in the exhaust air to settle on top of one another and which results in an improved separation of these paint particles from the exhaust air, is then produced by the intense atomization at the second constriction site. The agglomerated paint particles are then removed downwards into a fluid bath either along a guide surface located after the second constriction site or they are hurled against a wall opposite the second constriction site; at this wall the particles then also flow into the fluid bath.

In the known apparatus, the veil of fluid at the first constriction edge has a damping effect on the sound waves located inside the flow duct and spreading up toward the spray booth and which are primarily produced at the second sharp-edged flow constriction. A second sound damping is obtained by branching off the flow of exhaust air, since within the flow of exhaust air, the sound waves are, as a result, unable to expand in a straight line up towards the spray booth.

Another conventional water-spray separator is described in DE-OS 33 17 230. The exhaust air in this known water-spray separator is guided by a first venturi, expanded into a dispersion chamber and then guided by a second venturi with a sharp-edged throttle flange into a second chamber with a collecting zone. Rinsing fluid is introduced from a water reservoir into the funnel-shaped inlet area of the first venturi. The flow of exhaust air undergoes a change of direction in the first venturi and can flow through a relatively wide neck into the dispersion chamber. By not providing any sharp-edged projections in the first venturi and by the neck having a relatively wide through-flow cross section, the generation of noise is kept comparatively low in this area. A preliminary separation is achieved in the first venturi in that after passing the neck in droplet form, the water film running along the upper duct wall is mixed with the flow of exhaust air. A dispersing flow extending in a weak arc across a guide surface toward the second venturi is produced. In the second venturi, the polluted exhaust air and the water particles are mixed intensively to form a mist-like consistency. This process accompanies a relatively large generation of noise. On its way to the spray booth, the sound generated there is damped by the dispersing flow after the first venturi.

It is, however, desirable to reduce the sound level further compared to the noise levels in the working area achievable using conventional water-spray separators.

SUMMARY OF THE INVENTION

The invention's object is therefore to create a water-spray separator which has improved sound damping toward the working area.

This object is solved according to the invention by a water-spray separator comprising the features as claimed herein.

In the case of the water-spray separator according to the invention, the polluted exhaust air from the working area is introduced to the flow duct via the inlet, this air is subjected to a considerable change in direction and supplied to the duct outlet via the nozzle. The fluid introduced at the inlet's duct walls is atomized in a state of turbulence by the abrupt cross-sectional reduction at the duct outlet and the polluted exhaust air is homogeneously mixed with the fluid. This causes the impurity particles, such as paint particles, to settle on top of one another and to agglomerate with droplets of fluid, and the impurity particles are effectively separated after they have left the flow duct.

Due to the turbulent flow conditions, the most intense generation of sound takes place in the area of the nozzle and the duct outlet. It was found that a particularly effective sound damping is achieved toward the working area, e.g. a spray booth, if the sound generated in the area of the nozzle and the duct outlet is predominantly reflected back toward the nozzle and duct outlet. A reflector section arranged,in the flow duct opposite the nozzle area is therefore provided in the water-spray separator according to the invention, thereby causing most of the sound generated in the nozzle area to be reflected back toward the nozzle and to emerge through this nozzle, instead of allowing the sound to spread through the inlet of the flow duct toward the working area. The wall of the reflector section also diverges at least sectionally, in terms of the longitudinal section, from the shape of a straight line that connects the narrowest site between the inlet and the expansion section and the connecting point between the expansion section and the deflection section with one another. In addition to reflecting the sound toward the nozzle, a certain concentration in the area of the nozzle is achieved by this embodiment of the reflector section wall. An extremely effective reduction in the sound level reaching the working area from the water-spray separator is therefore achieved according to the invention.

In an advantageous extension of the invention, the reflector section is additionally designed as a concentrator. In consequence, not only does a mere reflection of the sound back into the nozzle area take place, but also a focusing of the sound reflected back. As a result, the efficacy of sound damping toward the working area can be improved. By concentrating the sound in the reflector/concentrator section, the reflected sound can be directed even more systematically toward the duct outlet so that the sound emerges directly through the duct outlet and no further reflections, by means of which parts of the sound might be deflected toward the outlet, are produced in the nozzle area.

In a favorable embodiment, the reflector section in the longitudinal section is bowl-shaped and the concave side of which faces the nozzle. The specific geometrical design of the bowl-shaped bulge in the duct wall opposite the nozzle depends on the geometrical ratios of the water-spray separator and is to be optimized experimentally for a specific water-spray separator configuration. Both smooth surface shapes and polygonal surfaces of the bowl-shaped reflector are suitable.

In preferred embodiments, the reflector section in the longitudinal section comprises a circular, parabolic or hyperbolic surface, though another comparable concave contour can also be chosen for the reflector section.

Other favorable embodiments are constituted by designing the reflector section in the longitudinal section in the form of a plurality of subsections. The individual subsections can either be straight or subsections with differing curve radii can be provided.

In a preferred embodiment, the duct wall containing the reflector section has an essentially S-shaped longitudinal section extent. The upper half of the S-shaped extent forms the one side of the inlet and the expansion section of the flow duct, while the lower half of the S-shaped extent forms the reflector section and the remaining section as far as the duct outlet. In this manner, the reflector section can be integrated very advantageously into the duct wall's surface extent. This integration of the reflector section entails advantages for production, since a large part of the duct wall can be produced integrally.

An advantageous embodiment of the water-spray separator according to the invention is obtained when all the surfaces of the duct walls are bent. When sufficiently large curvature radii are chosen, which should, if necessary, be determined by way of experiment, a stable laminar flow of the introduced fluid is obtained, since sharp edges in particular are likewise avoided. The avoidance of sharp edges also ensures that the generation of residual noise is kept to a minimum in the areas of the flow duct ahead of the abrupt cross-sectional reduction.

In a further embodiment of the invention, the reflector section is formed as a level surface. In an advantageous embodiment, the level surface is arranged substantially parallel to the vertical of the water-spray separator. In another favorable embodiment, the level surface is inclined toward the vertical of the water-spray separator such that the sound produced in the nozzle area is substantially reflected back toward the nozzle and the duct outlet. The angle of inclination alpha toward the vertical is preferably in the range of 0°<alpha<30°. Although these embodiments with a level surface as a reflector section do not lead to any concentration of the reflected sound, their production is less complex and hence they are more cost-effective.

It is beneficial to design the inlet in an axially symmetrical manner. An even and symmetrical flow of exhaust air in the working area, e.g. a spray booth, above the water-spray separator results therefrom.

It is also expedient when designing the water-spray separator venturi for the duct cross-section to be continuously decreased along the flow extent and to be continuously increased in the expansion section. A lower loss of pressure in the separator results therefrom.

In a favorable embodiment of the invention, the duct-wall transitions in the area of the inlet and the expansion section are gently rounded. This is necessary for a stable flow of fluid in these areas of the flow duct. For example, in the embodiments with a level surface as a reflector section, the transition from the reflector section to the adjoining downstream section of the relevant duct wall can however take place via an edge. A further preferred embodiment is to design all the duct-wall transitions to be gently rounded, thereby contributing to a laminar flow of the fluid in the duct extent that is as stable for as long as possible. Gently shaped transitions also help to avoid the accumulation of dirt in the flow duct and make it possible to clean and maintain the water-spray separator more easily.

The curvature radii in the area of the inlet, the expansion area and perhaps the deflection area of the flow duct should not be chosen to be too small so as to ensure a stable laminar flow of the fluid passing along the duct walls. The curvature radius of a bowl-shaped reflector section should not be dimensioned too small either so as to enable a concentration and reflection of sound in a sufficiently large section of the duct.

It is preferable for the duct wall section connecting the duct outlet to the reflector section to be formed as a level surface. When the water-spray separator is located below a working area, this level surface forms the base of the water-spray separator. By designing this base as a level surface, the simple geometry of this part entails a reduction in production costs, and the structural height of the water-spray separator is kept to a minimum, particularly when the level base wall is arranged horizontally. In an embodiment of the water-spray separator in which all the surfaces of the duct walls—perhaps with the exception of level inlet inflow surfaces—are otherwise designed to be bent, it is also advantageous for the base wall to be designed level in view of a low structural height of the water-spray separator, and for this wall to be positioned as horizontally as possible.

It is preferable for the abrupt cross-sectional reduction at the duct outlet to be designed in the form of a panel which is provided at the duct wall containing the reflector section. It is particularly advantageous to secure the panel in a detachable manner since this makes it easier to maintain and clean the water-spray separator from the outside through the duct outlet.

A further expedient embodiment of the water-spray separator is to provide between the inlet and expansion section a duct section, in the extent of which the cross section remains constant.

In addition to a low noise intensity in the working area, the embodiments of the water-spray separator according to the invention offer the following benefits: low susceptibility to dirt accumulation, simple maintenance, minimum space requirements, in particular a low structural height, minimum consumption of materials and low production costs. A high efficiency is achieved for particle separation and a highly stable laminar flow of fluid along the duct walls is attained.

BRIEF DESCRIPTION OF THE DRAWINGS

Exemplary embodiments of the water-spray according to the invention shall be explained in more detail with reference to the attached drawings as follows.

DESCRIPTION OF THE PREFERRED EMBODIMENTS

Figure 1:
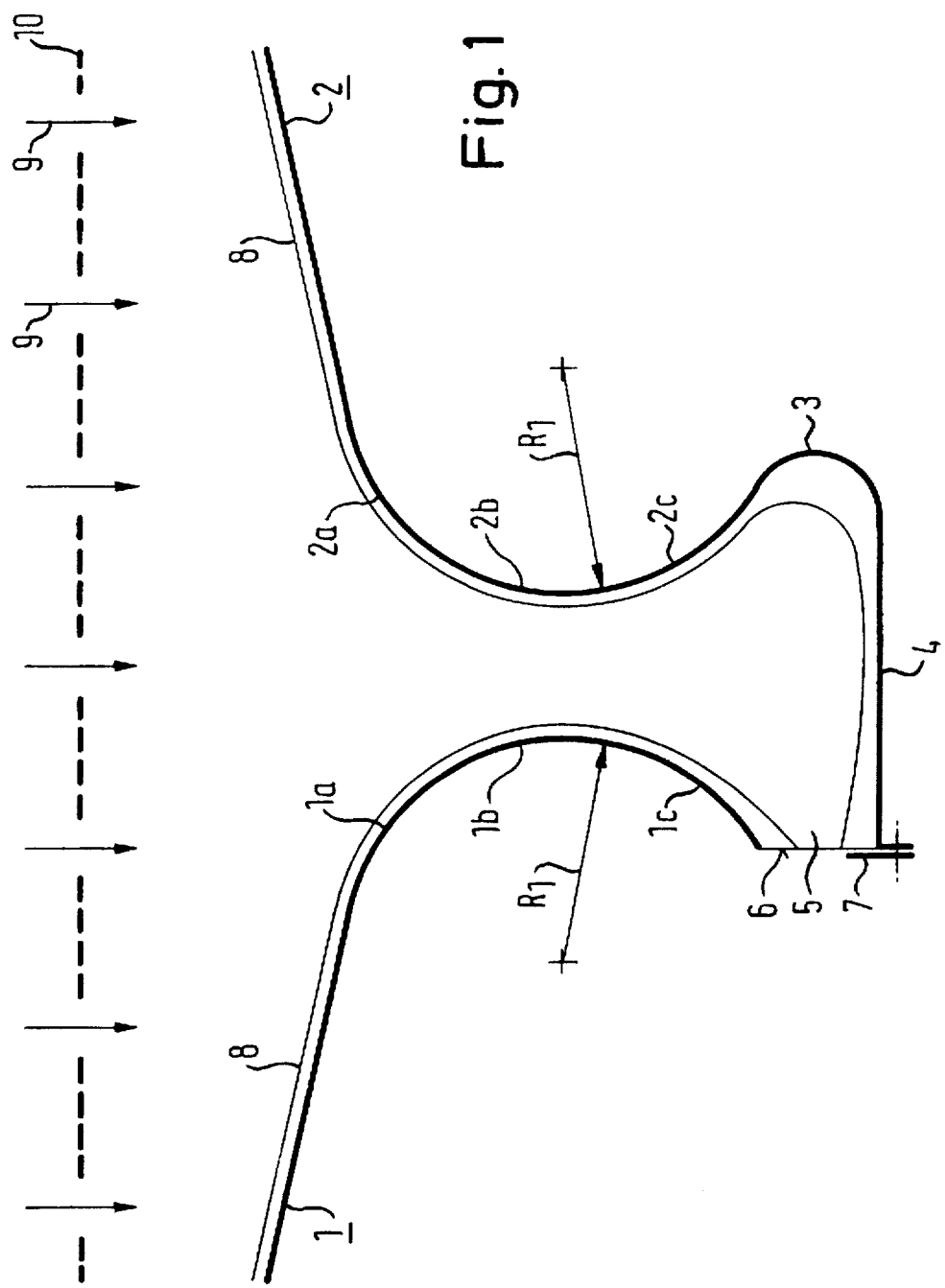
FIG. 1 shows a longitudinal section through a first embodiment of the water-spray separator according to the invention.

FIG. 1 shows a first embodiment of the water-spray separator according to the invention. The water-spray separator is arranged below a working area (not illustrated), such as a spray-painting booth, with the base of the working area being designed to be flow-permeable, e.g. in the form of a grid base 10. The exhaust air 9 polluted e.g. with paint particles enters the inlet 1a, 2a of the water-spray separator via flow-permeable base 10.

In the water-spray separator, a flow duct is formed by two duct walls 1, 2 spaced in relation to one another. In the first exemplary embodiment shown in FIG. 1, inlet 1a, 2a is symmetrically designed, whereby a bent inlet area adjoins level inlet inflow surfaces which are slightly inclined to one another in the shape of a funnel; in this inlet area, the duct cross-section continuously decreases until a minimum cross section at site 1b, 2b in the direction of flow, i.e. in the drawing from top to bottom. An expansion area 1c, 2c in which the duct cross-section continuously increases adjoins funnel-shaped inlet 1a, 2a downstream. A reflector/concentrator section 3 abutted by a deflection section 4 then follows at duct wall 2. A nozzle 5 is formed by the two duct walls 1, 2 in the flow section ahead of duct outlet 6. In the area of nozzle 5, the duct cross-section tapers continuously as far as duct outlet 6. A panel 7 which abruptly reduces the duct cross-section at duct outlet 6 is detachably mounted to duct outlet 6 at duct wall 2.

As shown in FIG. 1, the two duct walls 1, 2 are each formed by an equal radius $R_1$ in the area between the level inlet inflow surfaces and the outlet-side end of duct wall 1 or the start of reflector/concentrator section 3. Reflector/concentrator section 3 likewise has a circular longitudinal section. Deflection section 4 of duct wall 2 is designed as a level base plate running approximately parallel to base plane 10 of the working area. All the transitions of the individual duct sections are gently rounded and do not have any sharp edges. Only the abrupt cross-sectional reduction by means of panel 7 is formed as a sharp-edged constriction.

Figure 2:
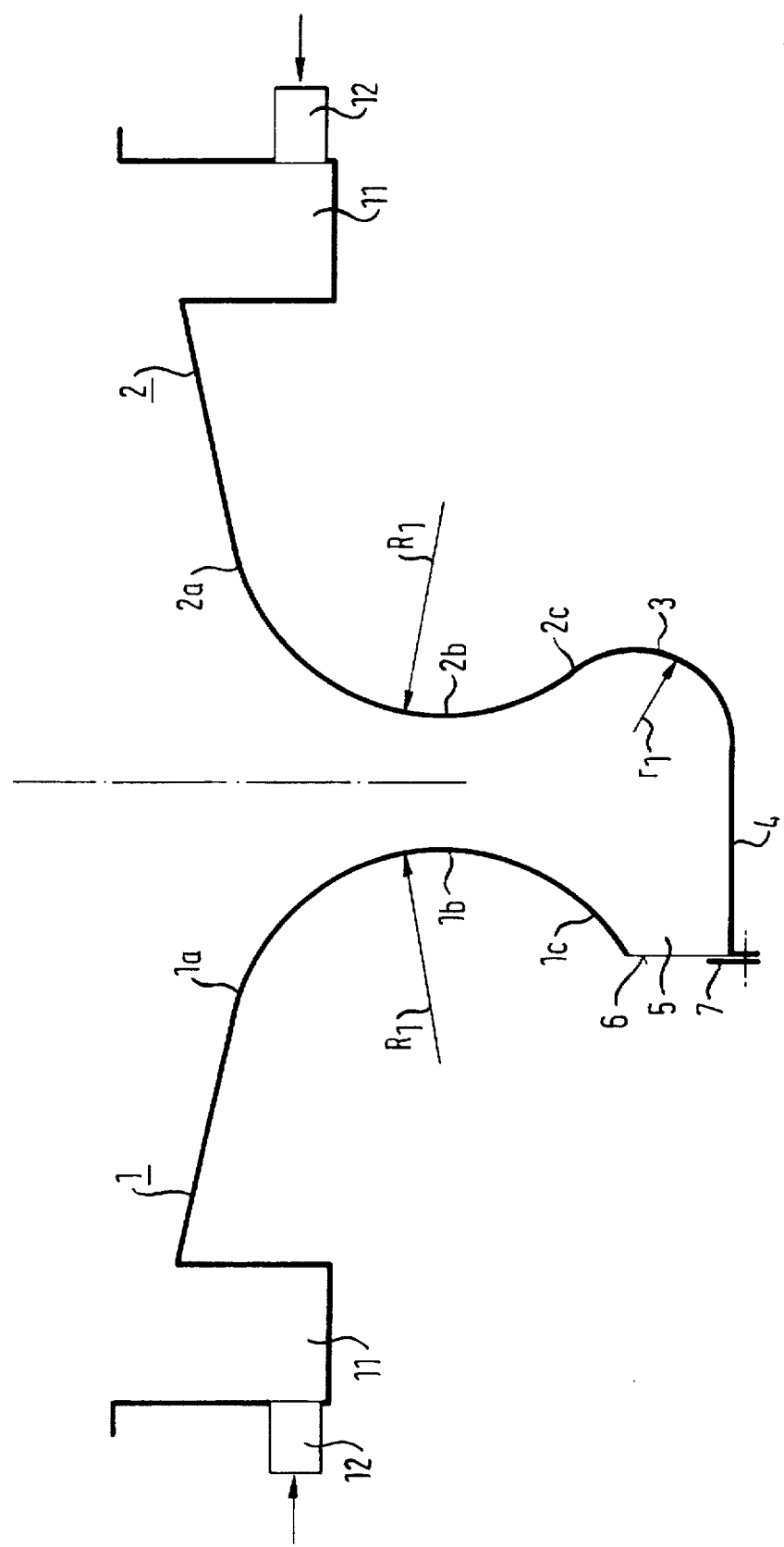
FIG. 2 shows a longitudinal section through a second embodiment of the water-spray separator according to the invention.

A fluid, passing along the inlet inflow surfaces of inlet 1a, 2a, is introduced into the water-spray separator's flow duct. The film of fluid is introduced in a known manner, e.g. an overflow of the fluid from reservoirs 11 fitted on both sides of the inlet, as shown in FIG. 2. Fluid reservoirs 11 located on both sides of inlet inflow surfaces 1a, 2a are constantly supplied with fluid via feed lines 12 (see arrow). Radius $R_1$ in the flow duct's inlet and expansion area is chosen in such a manner that the laminar flow of fluid along duct walls 1, 2 remains stable for as long as possible. As is evident from FIG. 1, the laminar flow of fluid remains stable on account of radius $R_1$ which has a sufficiently large dimension, and on account of the gentle transitions at duct wall 1 as far as nozzle 5 and at duct wall 2 as far as reflector/concentrator section 3, and only then does it separate from the duct walls. The stable laminar flow of fluid stops the duct walls from clogging up and any residual noise generated by the fluid in these areas is kept to a minimum.

Within duct wall 2, reflector/concentrator section 3 is shaped by gentle transitions to the adjacent duct sections. It is situated opposite duct outlet 6 and nozzle 5 against the direction of the outlet flow, with the direction of outlet flow in the drawing running in an approximately horizontal manner from right to left.

The functioning of the water-spray separator shall be described more closely in the following. The polluted exhaust air 9 flows through grid base 10 of the working area and is introduced into the water-spray separator by means of the level inlet inflow surfaces of inlet 1a, 2a. As shown in the drawing from top to bottom, the exhaust air flows through funnel-shaped inlet 1a, 2a, passes site 1b, 2b with a minimum duct cross section, and flows further through expansion section 1c, 2c. The direction of the flow of exhaust air is then deflected transverse to the original direction of flow within the inlet, i.e. in the drawing, a deflection of the direction of flow from top to bottom by about 90° into a direction of flow from right to left. In the area of nozzle 5, the flow of exhaust air 9 is then homogeneously mixed, in a state of turbulence, with the fluid 8 introduced via duct walls 1, 2; this mixing is caused by the abrupt cross-sectional reduction by means of panel 7. This homogeneous mixing process causes the impurity particles, such as paint particles, to settle on top of one another and to agglomerate; these particles are effectively separated once the mixture leaves through duct outlet 6. A substantial generation of sound occurs in the area of nozzle 5 and duct outlet 6. At bowl-shaped bulge section 3 of duct wall 2, the sound generated in the nozzle area is concentrated and reflected back toward nozzle 5. The radius of reflector/concentrator section 3 has a sufficiently large dimension so as to achieve an effective sound damping toward the working area. Reflector/concentrator section 3 therefore reflects the sound from the nozzle area, in a focused form, back toward nozzle 5 and duct outlet 6 so that a large part of the sound can escape through duct outlet 6 in an innocuous manner and does not enter the working area.

The second embodiment of the water-spray separator according to the invention as shown in FIG. 2 is concerned with a version of the first embodiment in which radius $r_1$ of the reflector/concentrator section 3 is dimensioned to be larger than in the version according to FIG. 1, thus yielding a larger height of section 3. In this version, the bulge of section 3 is not set so far back- in a horizontal direction either.

The second embodiment of the invention, like the first embodiment, has an inlet 1a, 2a symmetrical to the dash-dotted axis in the drawing. Water reservoirs 11 which are constantly supplied with fluid via feed lines 12 are arranged on both sides of inlet inflow surfaces 1a, 2a. As shown in FIG. 1, a fluid, passing along duct walls 1, 2, is introduced into the water-spray separator as a result of water reservoirs 11 continuously overflowing.

Figure 3:
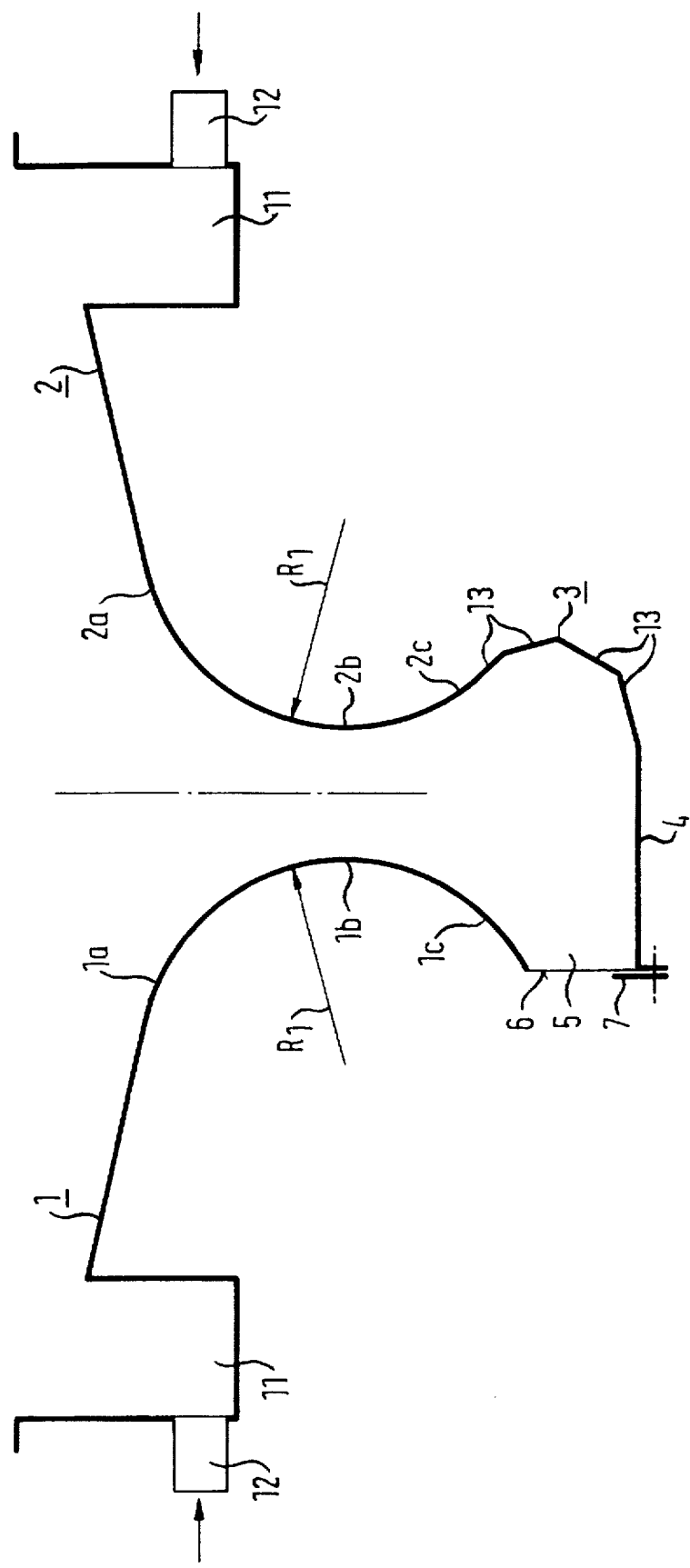
FIG. 3 shows a longitudinal section through a third embodiment of the water-spray separator according to the invention.

The third embodiment of the water-spray separator according to the invention as shown in FIG. 3 is a further version of the first and second embodiments according to FIGS. 1 and 2. In this embodiment, reflector/concentrator section 3 is formed from several straight subsections 13 that also lend the reflector/concentrator section a bulged shape, reflecting the sound in a focused form back toward nozzle 5 and duct outlet 6.

In the embodiments described as follows with reference to FIGS. 4 and 5, corresponding components are designated by the same reference numerals as those used in FIGS. 1, 2 and 3. Since the basic structure and the functional principle of the further embodiments are the same as those in the first three embodiments, only the differences in terms of designing the duct geometry compared to the previous embodiments will be explained for the further embodiments shown in FIGS. 4 and 5.

Figure 4:
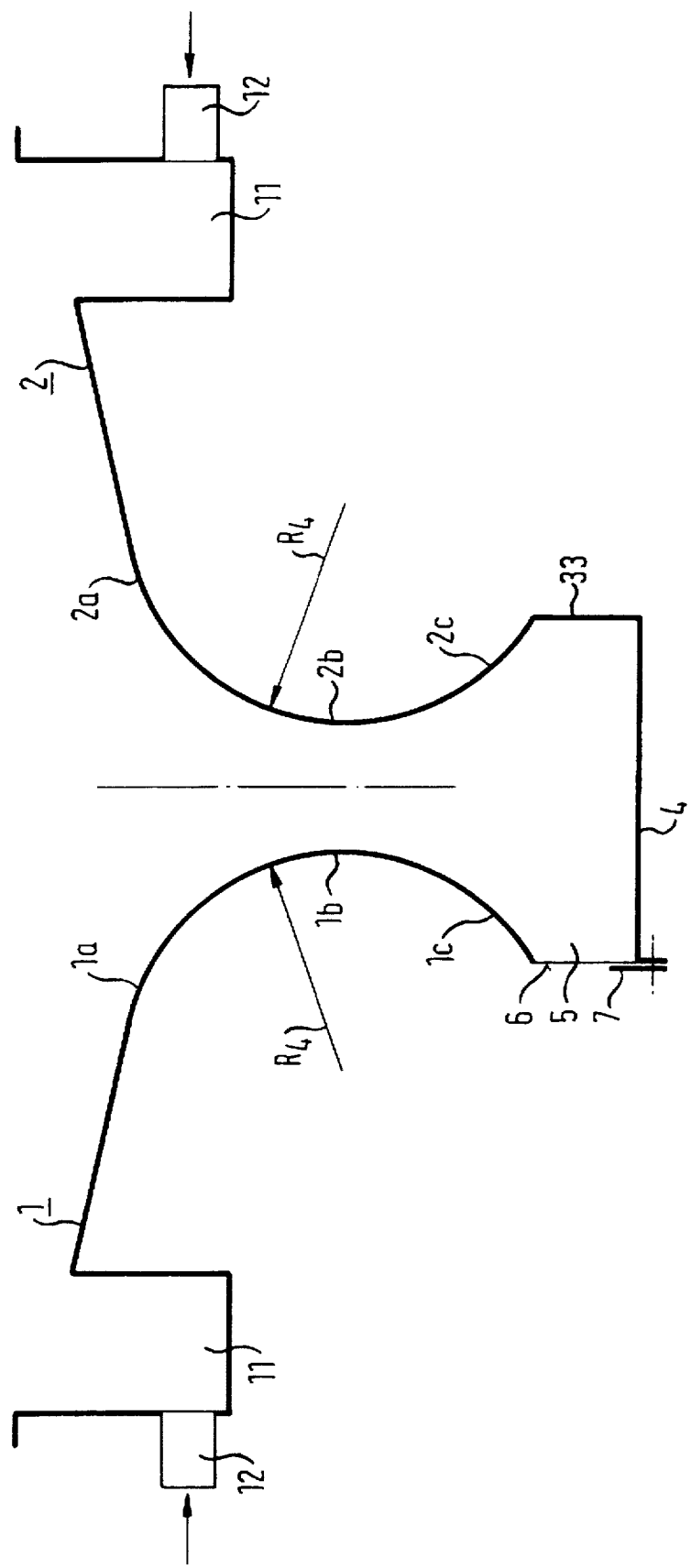
FIG. 4 shows a longitudinal section through a fourth embodiment of the water-spray separator according to the invention.

FIG. 4 represents a fourth embodiment of the water-spray separator according to the invention. The entire inlet and expansion area of the flow duct is formed in an axially symmetrical manner in relation to the axis marked in dots and dashes, whereby duct walls 1, 2 in the area of symmetry adjoining the level inlet inflow surfaces are designed to be circular with a radius $R_4$. Reflector section 33 is located parallel to the dash-dotted axis of symmetry and hence parallel to the direction of inlet flow. The height of reflector section 33 corresponds to the height of duct outlet 6 when panel 7 is taken off. Level reflector section 33 reflects in an unfocused manner the sound produced in the nozzle area back toward nozzle 5.

Figure 5:
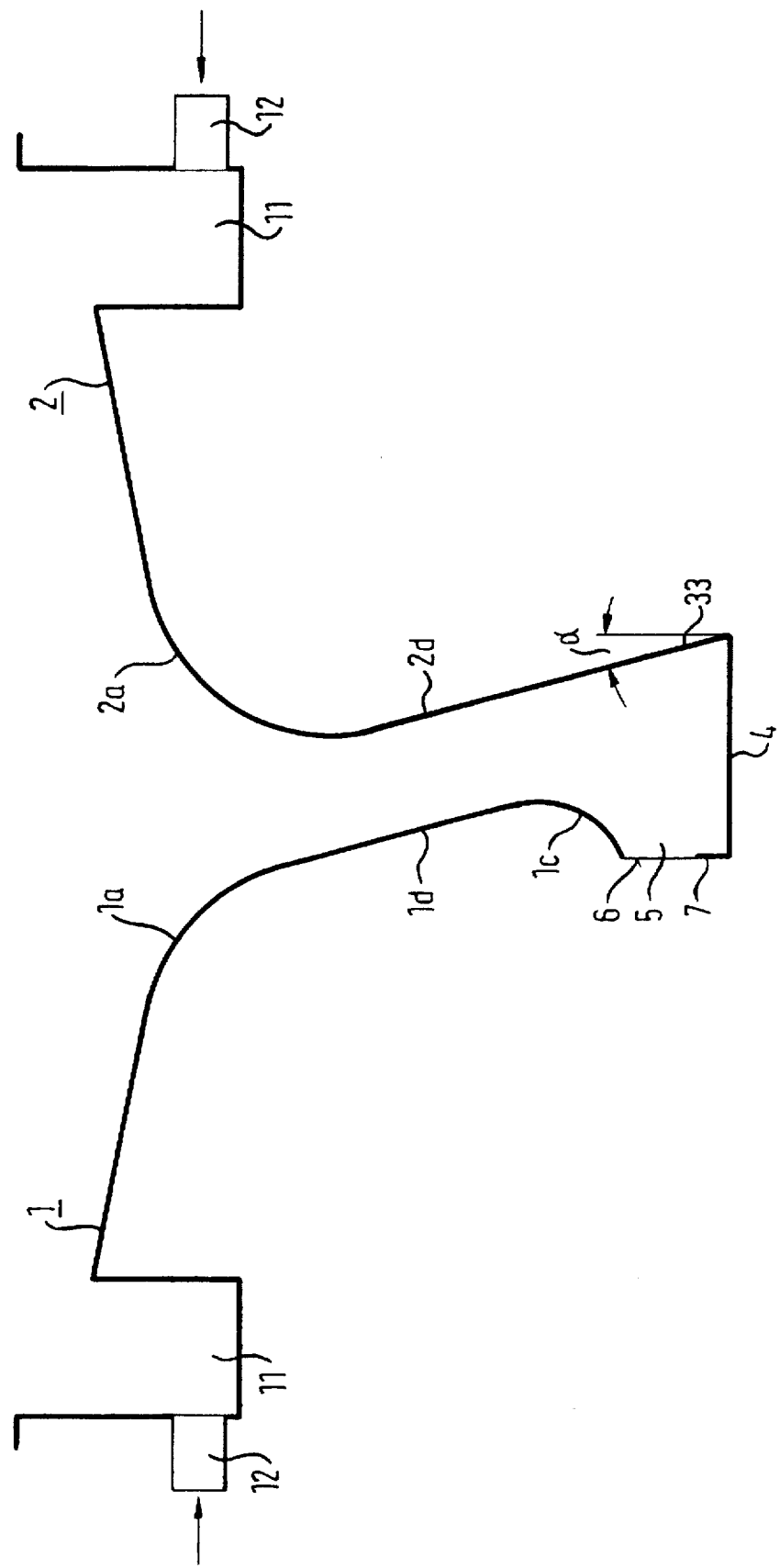
FIG. 5 shows a longitudinal section through a fifth embodiment of the water-spray separator according to the invention.

The fifth embodiment of the water-spray separator according to the invention as depicted in FIG. 5 has an asymmetrical inlet 1a, 2a which continues in a duct section 1d, 2d with a duct cross-section that remains constant along a flow route. Duct section 1d, 2d with a constant cross section is inclined by an angle of 0°<alpha<30° in relation to the water-spray separator's vertical. Level duct wall 2 within duct section 1d, 2d continues on the same plane as level reflector section 33, which on account of its inclination toward the vertical by an angle in the indicated range, reflects the sound produced in the nozzle area back toward nozzle 5 and duct outlet 6. Although a water-spray separator with a rear wall inclined toward the vertical is known from U.S. Pat. No. 5,100,422, this document does not provide any teaching to the extent that such an angle of inclination should be provided that the sound produced in the nozzle area is reflected back into the nozzle area.

All the previously described exemplary embodiments share a high efficiency during the separation of impurity particles from the exhaust air; at the same time they ensure that a very low noise level reaches the working area from the water-spray separator. A low structural height is also a feature of all the exemplary embodiments, to which the formation of deflection section 4 as a level base plate also contributes. If necessary, deflection section 4 can, however, also be formed as a bent duct wall. Gentle transitions in the inlet and expansion area of the flow duct are another principal feature shared by the depicted examples of the water-spray separator according to the invention. A stable laminar flow of fluid 8 in these areas of the water-spray separator is obtained as a result. This stable laminar flow stops duct walls 1, 2 from clogging up, thereby reducing the time and effort spent on cleaning. The water-spray separator's cleaning and maintenance is simplified by the gentle transitions and by the good accessibility of the individual duct sections, which is also helped by detachable panel 7. In the embodiments according to FIGS. 1 and 2, all the transitions are gently rounded in the flow duct so that a particularly low susceptibility to dirt accumulation is present here. As well as minimum space requirements, the exemplary embodiments described are characterized by a low consumption of materials and by low production costs, since use is made, on the one hand, of easy-to-produce level duct-wall sections and on the other, of duct sections with circular longitudinal sections, which to an extent are identical for both duct walls 1, 2. Finally, it should also be noted in relation to the embodiments according to FIGS. 1 to 3 that the reflector/concentrator sections combined therein contribute to particularly low losses of pressure in nozzle 5, which increases the water-spray separator's efficiency during the separation of impurities from the exhaust air.

The described exemplary embodiments of the water-spray separator according to the invention can of course be additionally modified as part of the claims.

We claim:

1. A water-spray separator for purifying particle-polluted exhaust air (9) from a working area, with a flow duct adjacent to said working area and having a cross-sectional extent set by two spaced duct walls (1, 2), into which flow duct polluted discharged air (9) flows and into which a fluid (8) is introduced to run along said duct walls (1, 2), said flow duct comprising the following:

an inlet (1a, 1b, 2a, 2b), an adjoining expansion section (1c, 2c), an adjoining deflection section (4) which deflects said discharged air (a) in a direction transverse to the direction of flow in said inlet (1a, 1b, 2a, 2b), an adjoining nozzle (5), and an adjoining duct outlet (6) at which an abrupt reduction (7) in the duct cross-section is provided, wherein a reflector section (3; 33) is provided which is formed on said duct wall (2) opposite said nozzle (5) against the direction of flow through said nozzle (5), which reflects the sound generated in the area of said nozzle (5) substantially back toward said nozzle (5), and the wall of which diverges at least sectionally, in terms of the longitudinal section, from the shape of a straight line that connects a narrowest site between said inlet (1a, 1b, 2a, 2b) and said expansion section (1c, 2c) and a connecting point between said expansion section (1c, 2c) and said deflection section (4) with one another.

2. A water-spray separator according to claim 1, wherein said reflector section (3) in the longitudinal section is bowl-shaped and faces said nozzle (5) with its concave side.

3. A water-spray separator according to claim 1, wherein said reflector section (3) in the longitudinal section has two or more straight subsections (13).

4. A water-spray-separator according to claim 1, wherein said reflector section (3) in the longitudinal section has two or more subsections with different curve radii.

5. A water-spray separator according to claim 1, wherein said duct wall (2) including said reflector section (3) has an essentially S-shaped longitudinal section extent.

6. A water-spray separator according to claim 1, wherein all the surfaces of said duct walls (1, 2) are bent.

7. A water-spray separator according to claim 1, wherein said inlet (1a, 1b, 2a, 2b) is axially symmetrical.

8. A water-spray separator according to claim 1, wherein the duct cross-section continuously decreases along the flow extent in said inlet (1a, 1b, 2a, 2b) and continuously increases in said expansion section (1c, 2c).

9. A water-spray separator according to claim 1, wherein at least transitions of said duct walls (1, 2) are gently rounded in the area of said inlet (1a, 1b, 2a, 2b) and said expansion section (1c, 2c).

10. A water-spray separator according to claim 1, wherein a duct wall section (4) connecting said duct outlet (6) to said reflector section (3) is formed as a level surface.

11. A water-spray separator according to claim 1, wherein a duct section (1d, 2d) with a constant cross section is provided between said inlet (1a, 1b, 2a, 2b) and said expansion section (1c, 2c).

12. A water-spray separator according to claim 1, particularly for purifying exhaust air (9) containing paint particles from a spray-painting booth.

13. A water-spray separator according to claim 1, wherein said reflector section (3; 33) is situated between said adjoining expansion section (1c,2c) and nozzle (5).

14. A water-spray separator according to claim 1, additionally comprising a detachable panel (7) arranged at said adjoining duct outlet (6) to form said abrupt reduction (7) in the duct cross-section.

15. A water-spray separator for purifying particle-polluted exhaust air (9) from a working area, with a flow duct adjacent to said working area and having a cross-sectional extent set by two spaced duct walls (1,2), into which flow duct polluted discharged air (9) flows and into which a fluid (8) is introduced to run along said duct walls (1,2), said flow duct comprising the following:

an inlet (1a,1b,2a,2b).

an adjoining expansion section (1c,2c).

an adjoining deflection section (4) which deflects said discharged air (9) in a direction transverse to the direction of flow in said inlet (1a,1b,2a,2b), an adjoining nozzle (5), and an adjoining duct outlet (6) at which an abrupt reduction (7) in the duct cross-section is provided, wherein a reflector section (3; 33) is provided which is formed on said duct wall (2) opposite said nozzle (5) against the direction of flow through said nozzle (5), which reflects the sound generated in the area of said nozzle (5) substantially back toward said nozzle (5), the wall of which diverges at least sectionally, in terms of the longitudinal section, from the shape of a straight line that connects a narrowest site between said inlet (1a,1b,2a,2b) and said expansion section (1c,2c) and a connecting point between said expansion section (1c, 2c) and said deflection section (4) with one another, and said reflector section is additionally formed as a concentrator (3).

16. A water-spray separator according to claim 15, wherein said reflector section (3) in the longitudinal section has a circular, parabolic or hyperbolic surface.

17. A water-spray separator according to claim 15, wherein said reflector section (3) in the longitudinal section has two or more straight subsections (13).

18. A water-spray separator according to claim 15, wherein said reflector section (3) in the longitudinal section has two or more subsections with different curve radii.

19. A water-spray separator according to claim 15, wherein said duct wall (2) including said reflector section (3) has an essentially S-shaped longitudinal section extent.

20. A water-spray separator according to claim 15, wherein all surfaces of said duct walls (1, 2) are bent.

21. A water-spray separator according to claim 15, wherein said inlet (1a, 1b, 2a, 2b) is axially symmetrical.

22. A water-spray separator according to claim 15, wherein the duct cross-section continuously decreases along the flow extent in said inlet (1a, 1b, 2a, 2b) and continuously increases in said expansion section (1c, 2c).

23. A water-spray separator for purifying particle-polluted exhaust air (9) from a working area, with a flow duct adjacent to said working area and having a cross-sectional extent set by two spaced duct walls (1,2), into which flow duct polluted discharged air (9) flows and into which a fluid (8) is introduced to run along said duct walls (1,2) said flow duct comprising the following:

an inlet (1a,1b,2a,2b), an adjoining expansion section (1c,2c).

an adjoining deflection section (4) which deflects said discharged air (9) in a direction transverse to the direction of flow in said inlet (1a,1b,2a,2b).

an adjoining nozzle (5), and an adjoining duct outlet (6) at which an abrupt reduction (7) in the duct cross-section is provided, wherein a reflector section (3; 33) is provided which is formed on said duct wall (2) opposite said nozzle (5) against the direction of flow through said nozzle (5), which reflects the sound generated in the area of said nozzle (5) substantially back towards said nozzle (5), the wall of which diverges at least sectionally, in terms of the longitudinal section, from the shape of a straight line which connects a narrowest site between said inlet (1a,1b,2a,2b) and said expansion section (1c,2c) and a connecting point between said expansion section (1c, 2c) and said deflection section (4) with one another, and said reflector section (3) in the longitudinal section has a circular, parabolic or hyperbolic surface.

* * * * *